United States Patent [19]

Fellmann

[11] 4,232,422
[45] Nov. 11, 1980

[54] HAND TOOL WITH REMOVABLE EXTENSION HANDLE

[75] Inventor: Ruedi Fellmann, Dietlikon, Switzerland

[73] Assignee: Max Langenstein Feld- und Gartengeräte, Illertissen, Fed. Rep. of Germany

[21] Appl. No.: 944,311

[22] Filed: Sep. 21, 1978

[30] Foreign Application Priority Data

Sep. 24, 1977 [DE] Fed. Rep. of Germany .... 7729610[U]

[51] Int. Cl.³ .......................... A01B 1/14; F16D 1/00
[52] U.S. Cl. ............................... 16/110 R; 403/343; 172/378
[58] Field of Search .............. 172/371, 372, 375, 378; 15/143 B, 145; 16/110 R; 74/543, 544; 7/167; 403/305, 306, 308, 361, 343

[56] References Cited

U.S. PATENT DOCUMENTS

| 1,480,365 | 1/1924 | Bennett | 403/361 X |
|---|---|---|---|
| 1,749,674 | 3/1930 | Roberson | 172/371 |
| 2,113,821 | 4/1938 | Baash | 403/343 X |
| 2,817,867 | 12/1957 | Bugbird | 15/145 X |
| 3,004,362 | 10/1961 | Day | 16/110 R X |
| 3,091,790 | 6/1963 | Schroeder | 15/143 B X |
| 4,152,086 | 5/1979 | Achenbach et al. | 403/361 X |
| 4,162,132 | 7/1979 | Kress et al. | 403/361 |

FOREIGN PATENT DOCUMENTS

651385 10/1937 Fed. Rep. of Germany ........... 403/341

*Primary Examiner*—Richard T. Stouffer
*Attorney, Agent, or Firm*—Karl F. Ross

[57] ABSTRACT

A tool such as a garden cultivator, squeegee, or paint-roller holder has a relatively short handle provided at its rear end with a relatively deep backwardly open recess. An extension handle has a relatively long front end engageable relatively far into this recess and is provided with a fixed ring formed with a multiple screwthread engageable with a similar formation inside the recess so that the two parts can be locked together by a single revolution relative to each other. At its rear end the extension handle is provided with a cap having a forwardly directed end and screwthread formations similar to that of the front and of the extension handle so that this cap can be placed on the rear end of the short handle of the tool if desired.

9 Claims, 5 Drawing Figures

HAND TOOL WITH REMOVABLE EXTENSION HANDLE

FIELD OF THE INVENTION

The present invention relates to a hand tool with a removable extension handle. More particularly this invention concerns a tool such as a rake, squeegee, cultivator, trowel, or the like.

BACKGROUND OF THE INVENTION

Various tools, in particular garden tools such as cultivators shovels and rakes, as well as other tools such as squeegees or paint-roller holders are usually provided with relatively short handles. These handles are used whenever the work is relatively close to the user, as for instance when the user is working in the garden on his or her hands and knees, or when cleaning a relatively low window. Nonetheless it is frequently desired to be able to work at some distance from the location where the tool is to engage, as for instance when cultivating in a standing position, when washing a car, or cleaning a relatively high window, or when roller-painting a tall wall or a high ceiling.

Accordingly it is known to provide such tools with extension handles. In the standard systems the extension handle merely has a threaded male projection on one end that fits into a corresponding threaded female recess at the end of the short handle of the tool. Thus the user need merely fix the two together by rotating either the tool or its handle to mount the extension handle firmly on the tool. The disadvantage of this system is that the male projection is relatively short, so that the transmission of lateral or bending forces, as contrasted to longitudinal pressure and tension forces, can lead to deformation of the tool at the connection. Another disadvantage is that the handle must be carefully fitted into and screwed several rotations into the tool for proper mounting. If not screwed all the way in any lateral forces are normally sufficient to damage the screw threads and ruin both the tool and the extension handle.

It has been suggested to overcome some of these disadvantages by providing the extension handle with a relatively long and stepped male projection at its front end that fits into a correspondingly deep and stepped backwardly open female recess. The male projection is provided along its full length with screwthreads of like pitch, so that the large-diameter portion and small-diameter portion of the male part can fit into large-diameter and small-diameter portions of the female part and screw thereinto simultaneously. The system has the considerable disadvantage that it is relatively expensive to manufacture. Furthermore this arrangement once again requires the user to fit the two tools together while aligning the threads and thereafter to laboriously screw the two parts together.

OBJECTS OF THE INVENTION

It is therefore an object of the instant invention to provide an improved tool with an extension handle.

Another object is to provide an improved arrangement for connecting a tool and an extension handle together.

Yet another object is the provision of such a tool which can be produced at relatively low cost, yet wherein the connection between the two parts can be effected with ease and will be very strong both with respect to lateral and longitudinal forces.

SUMMARY OF THE INVENTION

These objects are attained in accordance with the present invention in a tool wherein the extension handle has a relatively long forwardly extending front end that fits into a generally complementary recess at the rear end of the relatively short handle of the implement while being longitudinally slidable and rotatable therein. The extension handle is provided immediately behind this front end with a ring that is rotationally and longitudinally fixed to the extension handle and that has a forwardly directed end face flatly engageable with a backwardly directed rim surrounding the recess of the short end of the implement. Furthermore this ring has a forwardly extending collar that engages within the recess around the front end when the device is assembled and that furthermore is provided with formations that coact with formations inside the recess to lock the short handle and extension handle together. According to this invention the front end of the extension handle is substantially cylindrical and has a predetermined diameter that is equal to at most half the longitudinal length of this front end. Thus, the connection between the two parts according to this invention will allow transmission of considerable bending forces, which will be transmitted to the cylindrical front end of the extension handle and through the relatively deep recess so that these bending stresses will not be able to separate the two parts and break the tool. At the same time this relatively long part does not need to be laboriously screwed into the short handle of the implement, so that assembly is easy and for this reason the likehood of the extension handle not being properly connected to the implement is greatly reduced.

According to another feature of this invention the extension handle is formed at its rear end with a recess and rim identical to that of the rear end of the short handle of the implement itself. A cap provided with a forwardly extending front end and end face identical to that of the front end of the extension handle is fitted to the rear end of this extension handle. It is possible with this arrangement to remove the extension handle and fit the cap into the rear end of the short implement handle, thereby closing same and preventing foreign bodies or matter from entering into the recess.

According to the instant invention the interengaging formations are a multiple screw thread formed on the collar of the protective cap and of the ring, and a corresponding formation inside each of the recesses. This screwthread is of such length and pitch that the cap and extension handle can be locked in the respective recesses by a single 360° turn of themselves. At the same time the use of a multiple thread ensures excellent longitudinal force transmission, so that even though the connection is very easy the same holding effect is achieved as in the prior-art systems which require multiple turns of the parts relative to each other to screw them together.

SPECIFIC DESCRIPTION

Figure 1:
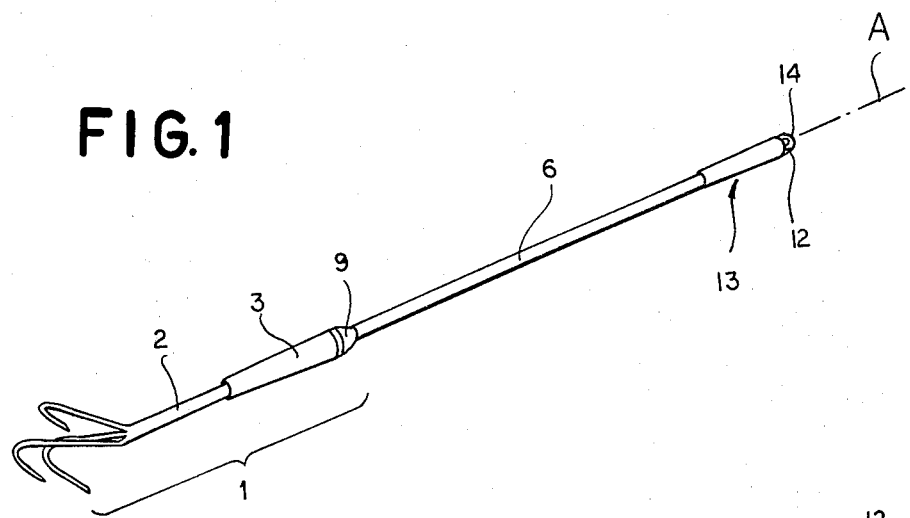
FIGS. 1 and 2 are perspective views illustrating the tool according to the instant invention in assembled and exploded condition.
Figure 2:
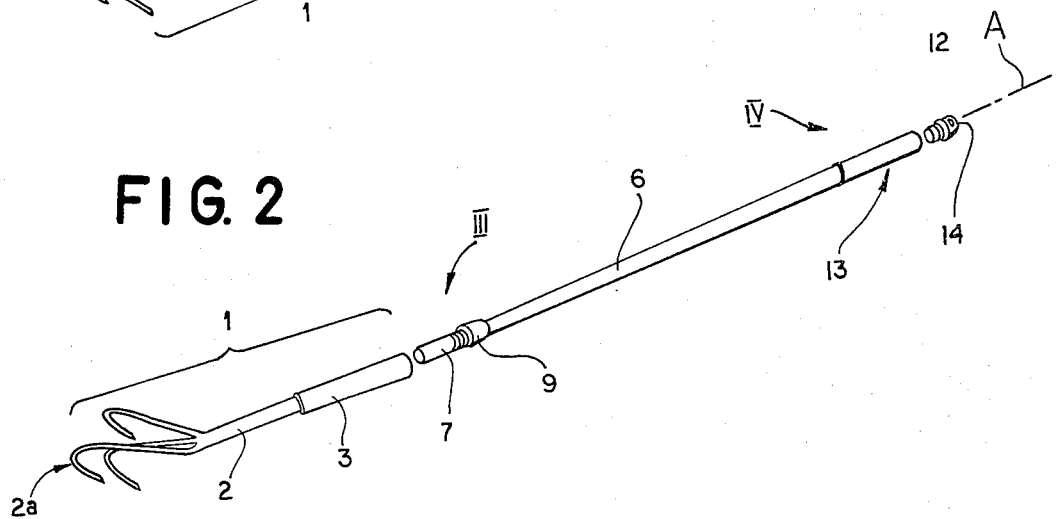
Figure 5:
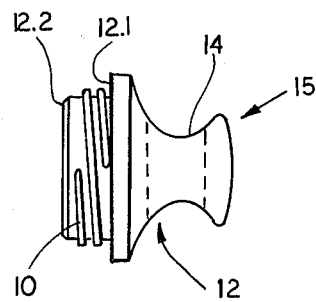
FIG. 5 is a view taken in the direction of arrow V of FIG. 4.

As shown in FIGS. 1 and 2 a tool according to this invention basically comprises a relatively short implement 1, here a garden cultivating rake, provided with an extension handle 6 and an end cap 12. The entire tool is elongated along a longitudinal axis A. The tool can be subdivided at the regions indicated at III and IV as shown in FIG. 2 into three separate pieces.

The implement 1 has an aluminum tubular shaft 2 formed at its front end with a three-tine fork 2a and at its rear end with an inwardly bent lip 2b. This rear end is fitted inside a syntheticresin handle or end piece 3 having a forwardly open cylindrical recess 3a that closely receives the rear end of the tube 2 and a backwardly open flared recess 5. Between the recesses 3a and 5, the end piece 3 is formed with a transverse wall 3b having a central throughgoing hole 3c and a forwardly directed extension 4 that projects somewhat laterally and engages inside the lip 2b. Thus the handle 2 can rotate about the axis A relative to the end piece 3.

At the backwardly slightly flared recess 5 the piece 3 is formed with four angularly equispaced and axially extending ribs 8 having inner surfaces 8a lying on an imaginary cylinder centered on the axis A. Furthermore, this piece 3 has a rear end surface or rim 3d lying in a plane perpendicular to the axis A, and is formed inwardly of this end surface 3d with a pair of screwthread grooves 11 of identical pitch and having starting points offset 90° to each other.

The extension handle 6 is also formed of a light metal, here aluminum, and is tubular and of a regular diameter and crosssectional size and shape. It has a forward end 7 of a diameter d substantially equal to the diameter defined by the inner surfaces 8a of the ribs 8, and a length L equal here to 2.5 times the diameter d. In addition, extension handle 6 is provided immediately behind the region 7 with a ring 9 having a forwardly directed face 9a lying in a plane perpendicular to the axis A and of a diameter D identical to the outer diameter of the piece 3 at the rear face 3d. Behind this surface 9a the ring 9 has a short cylindrical portion and then a frustoconical portion. This ring 9 is locked longitudinally and rotationally on the tube constituting the extension handle 6, here by an adhesive, although it is possible to use riveting or other such fastening. Furthermore this ring 9 has a forwardly extending collar 9b formed with a pair of screwthreads 10 starting 90° offset from each other and complementary to the grooves 11.

Thus it is possible to fix the extension handle 6 to the tool 1 simply by inserting the front end 7 into the recess 5, and then rotating the handle 6 and tool 1 relative to each other through 360° to engage and thread the two formations 10 and 11 into each other and to bring the faces 9a and 3d into tight flush contact. When thus fitted together ring 9 will effectively form a smooth continuation of the piece 3 so that foreign matter will not be able to enter between these two parts. Thus even if the end piece 3 is used as a handle for a painting roller the possibility of paint entering into and fouling the connection between it and the extension 6 is eliminated.

Figure 3:
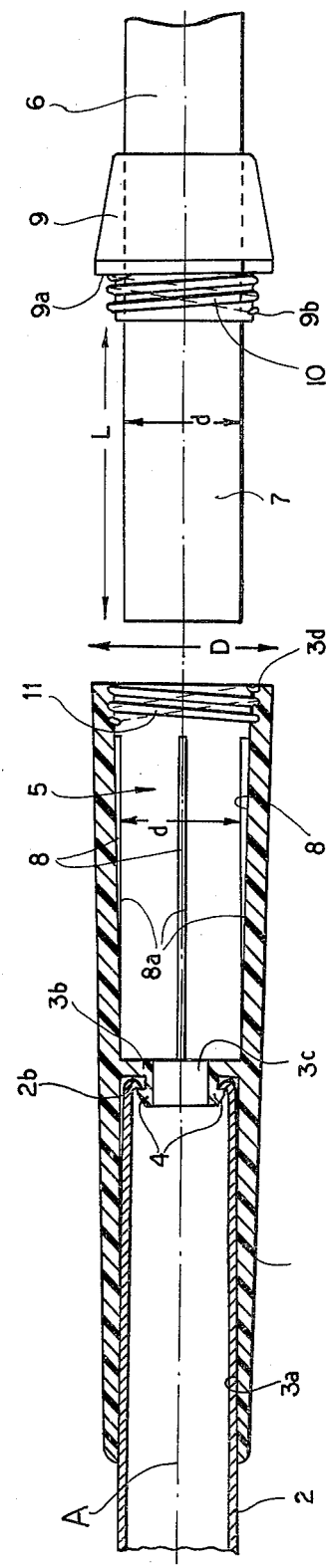
FIGS. 3 and 4 are axial sections taken of the regions indicated at III and IV, respectively, in FIG. 2.
Figure 4:
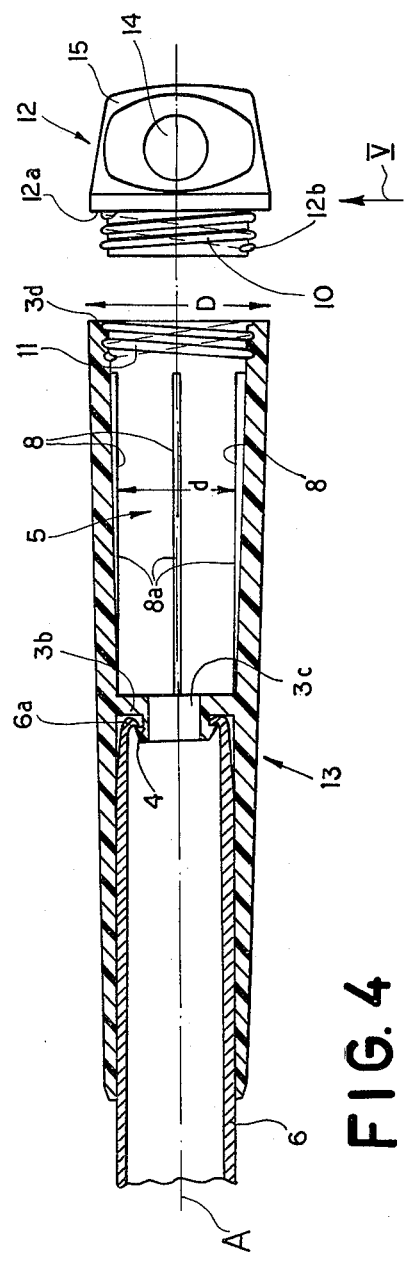

The extension handle 6 is provided at its rear end with an end piece 13 identical to the end piece 3 as can clearly be seen by comparison of FIGS. 3 and 4. The rear end of the tube constituting the extension handle 6 is formed with an inwardly bent lip 6a that is substantially identical to the lip 2b of the handle 2. Otherwise the same reference numerals are used in FIG. 4 for structure identical to that of FIG. 3.

Engageable over the rear end of the end piece 13 is a protective cap 12 which has a rear part 15 formed with a throughgoing hole 14 and a front part having an end face 12a identical to the end face 9a, a collar 12b identical to the collar 9b and a pair of screwthreads 10 identical to the screwthreads 10 of FIG. 4. Thus this cap can be screwed into the rear end of either of the end pieces 3 or 13 so as to block such rear end and to provide a convenient hole 14 for hanging up of the utensil whether it is provided with the extension handle or not. This cap 12 completely fills the recess 5 over which it is engaged and can even be used to hang up the extension handle alone if desired.

Thus the tool according to the instant invention can easily be lengthened by provision of the extension handle which due to its long front end 7 can transmit considerable lateral forces, and yet which can easily be connected to the implement 1. The fitting of the extension 6 is therefore an extremely easy task, as is its removal. Thus the tool can be used either when long or short, and conversion is very easy.

I claim:
1. A tool comprising:
   an implement;
   a relatively short elongated handle having a front end connected to said implement and a rear end formed with a longitudinally backwardly open recess and having a longitudinally backwardly directed rim surrounding this recess;
   a relatively long extension handle having a front end formed as a longitudinal projection snugly engageable forwardly in said recess and longitudinally slidable and rotatable therein;
   a connecting ring surrounding and fixed longitudinally and rotationally to said extension handle adjacent said front end thereof, said ring having a forwardly directed end face engageable longitudinally flatly against said rim and having a forwardly extending collar extending from said end face toward said front end of said extension handle and engageable inside said recess with said rear end of said short handle; and
   means including interengaging generally helical formations on said collar and in said recess of said short handle for locking said handles together screwthread-fashion with said end face bearing longitudinally on said rim.
2. The tool defined in claim 1 wherein said front end of said extension handle is substantially cylindrical and has a predetermined diameter and a length equal to at least twice said diameter.
3. The tool defined in claim 1 wherein said formations include a multiple thread on said collar.
4. The tool defined in claim 1 wherein said extension handle has a rear end formed with a recess and rim identical to the recess and rim of said short handle, said tool further comprising an end cap having a portion formed substantially identically to said end face and collar of said ring.
5. The tool defined in claim 4 wherein said end cap is formed with a throughgoing hole adapted to hanging-up of said tool.
6. The tool defined in claim 1 wherein said short handle includes a shaft part fixed to said implement and an end part forming said recess and rim and rotatable relative to said shaft part about the longitudinal axis of said short handle.

7. The tool defined in claim 1 wherein said extension handle is a light-metal tube.

8. The tool defined in claim 7 wherein said ring is of synthetic-resin material and has an outer diameter at said end face substantially equal to the outer diameter of said short handle at said rim.

9. The tool defined in claim 1 wherein said implement is a cultivating tool.

* * * * *